3,240,679
FUEL ELEMENTS FOR NUCLEAR REACTORS
John Brian Sayers, Didcot, England, assignor to United Kingdom Atomic Energy Authority, London, England
No Drawing. Filed Oct. 25, 1962, Ser. No. 233,135
Claims priority, application Great Britain, Nov. 3, 1961, 39,407/61
3 Claims. (Cl. 176—72)

The present invention relates to fuel elements for nuclear reactors and is more particularly concerned with fuel elements for high temperature reactors. It will be known that one of the preferred forms of fuel element comprises a non-metallic fissile material enclosed in a protective sheath or can.

One of the advantages of using non-metallic fissile materials, e.g. oxides and carbides, instead of fissile metal is that they may be allowed to reach a much higher temperature without melting. Unfortunately, however, at these higher temperatures the pressure exerted by gaseous fission products released during irradiation in a nuclear reactor may be very high and if the fissile material is in the form of a solid mass, a relatively thick and strong sheath is necessary and this is undesirable for neutron economy reasons. The use of a non-fissile metallic matrix material for the fuel, i.e. a cermet, has the advantage that the high conductivity of the fuel ensures that the temperature existing at the centre of the fuel element is not so high, but the use of a cermet introduces other difficulties.

It has been proposed to use hollow or ring-like bodies or "pellets" of fissile material, with the intention that there should be sufficient free voidage to allow the fission product gases to collect in the spaces without building up excess pressure, but we have found that the fissile material is so brittle that thermal shock during irradiation will almost inevitably cause fracture of the pellets, with the result that particles of fissile material may collect at the bottom of the sheath and so cause local hot-spots. Subsequent mechanical shock in handling will accentuate this situation. At temperatures above 1600° C. considerable grain growth occurs which has the advantage of binding the centre portion of the pellets together.

It has also been proposed (U.S. Patent 2,864,758) to support the pellets by a core of non-fissile refractory material, for example magnesia, but above a temperature of about 1600° C. the magnesia migrates and fails to fulfill its function.

Accordingly it is an object of the present invention to provide a new or improved fuel element for nuclear reactors.

It will, of course, be understood that for compatibility reasons the support material is desirably the same chemical compound of the same fissile element as the fuel ring, thus differing only in the degree of enrichment. Very desirably the non-metallic fissile material is the oxide. It is convenient to form the support material into a ring in order to retain a free space for the gaseous fission products. The pellets of this invention will, of course, be enclosed within a sheath, which is sealed to prevent contact between the fissile material and the coolant, thereby to form a complete element. Typically the sheath may be made of stainless steel and filled with helium.

It will be understood that the maximum fuel element temperature depends on many factors but in general it is quite obvious that the higher the outside temperature of the pellet, the higher will be the sheath surface temperature and therefore the more heat that will be transferred to the coolant. For a given pellet outside temperature, the inside (or maximum) temperature will depend on inside diameter, heat rating and other factors.

By way of example in accordance with the invention, it is convenient to consider a pellet in the form of a fuel ring made of uranium dioxide enriched to 2% uranium-235, this pellet being ring-shaped with an outside diameter of 0.95 in. It is to be noted that, within limits, the length is immaterial, but the length of 0.5 in. is suitable. The design rating of the fuel ring is 20 watts/gm. uranium dioxide and the surface temperature is 750° C. On the above basis, the inside diameter of the fuel ring is 0.58 in. and the inside surface temperature is 1450° C. The inside or support ring is made of depleted uranium dioxide containing only 0.43% uranium-235 and has an outside diameter of 0.575 in. With a rating of 3.7 watts/gm. for this ring and an outside temperature of 1570° C. (due to the gas gap) the support ring has an inside surface temperature of 1610° C. at a diameter of 0.38 in. The more depleted is the uranium dioxide of the support ring, the better the results obtained.

It will be observed that in this specific example the support ring is at a temperature at which some grain growth takes place to provide a measure of additional support, but the temperature differential across the support ring is so low that thermal cracking is unlikely. Moreover, its burn-up is so low, compared with the fuel ring, that the pressure contribution from the support ring is small, for the release of appreciable quantities of fission product gas is unlikely. On the other hand, the appreciable thickness of the composite ring gives considerable strength without the penalty of excessive temperature rise and thus helps to prevent mechanical and thermal fracture and disintegration of the composite ring. Moreover there is no addition of parasitic material and the degree of enrichment of the fuel ring may be slightly reduced.

I claim:
1. A fuel element for a nuclear reactor comprising a generally cylindrical metallic sheath, a plurality of fuel rings of enriched uranium dioxide located within and coaxial with said sheath and a plurality of support rings of uranium dioxide having a reduced content of U-235, such support rings being located within and coaxial with said fuel rings and separated therefrom by a space containing a gaseous medium.

2. The fuel element of claim 1, wherein the sheath is made of stainless steel.

3. The fuel element of claim 2, wherein the gaseous medium is helium.

References Cited by the Examiner
UNITED STATES PATENTS

| | | | |
|---|---|---|---|
| 2,852,460 | 9/1958 | Abbott et al. | 176—68 |
| 2,864,758 | 12/1958 | Shackelford | 176—83 |
| 3,042,598 | 7/1962 | Crowther | 176—10 |

OTHER REFERENCES

Principles of Nuclear Reactor Engineering, by Glasstone, November 1955, pp. 45, 46, 326 and 327.

CARL D. QUARFORTH, *Primary Examiner.*

REUBEN EPSTEIN, *Examiner.*